(12) United States Patent  
Karai et al.

(10) Patent No.: US 10,626,912 B2  
(45) Date of Patent: Apr. 21, 2020

(54) HEAD ASSEMBLY FOR SUPPORTING AND ADJUSTING THE POSITION OF AN OPTICAL OR ELECTRONIC DEVICE

(71) Applicants: Csaba Karai, Zsambek (HU); Balazs Karman, Zsombo (HU); Laszlo Novak, Balatonalmadi (HU)

(72) Inventors: Csaba Karai, Zsambek (HU); Balazs Karman, Zsombo (HU); Laszlo Novak, Balatonalmadi (HU)

(73) Assignee: CSABA KARAL, Zsámbék (HU)

(*) Notice: Subject to any disclaimer, the term of this patent is extended or adjusted under 35 U.S.C. 154(b) by 755 days.

(21) Appl. No.: 14/363,302

(22) PCT Filed: May 7, 2014

(86) PCT No.: PCT/HU2014/000040  
§ 371 (c)(1),  
(2) Date: Jun. 6, 2014

(87) PCT Pub. No.: WO2014/195745  
PCT Pub. Date: Dec. 11, 2014

(65) Prior Publication Data  
US 2016/0076583 A1    Mar. 17, 2016

(30) Foreign Application Priority Data

Jun. 7, 2013 (HU) .................................. 1300365  
Dec. 18, 2013 (HU) .................................. 1300738

(51) Int. Cl.  
*F16C 11/06* (2006.01)  
*F16M 11/12* (2006.01)  
(Continued)

(52) U.S. Cl.  
CPC .......... *F16C 11/0609* (2013.01); *F16C 11/06* (2013.01); *F16C 11/106* (2013.01);  
(Continued)

(58) Field of Classification Search  
CPC ..... F16C 11/0609; F16C 11/06; F16C 11/106; F16C 11/125; F16C 11/2078; F16C 13/02; F16C 2200/022; F16M 1/14  
(Continued)

(56) References Cited

U.S. PATENT DOCUMENTS 1,913,459 A * 6/1933 Skillman ............. F16C 11/0604  
                                                                       267/66  
2,576,830 A * 11/1951 Flumerfelt .......... F16C 11/0604  
                                                                       403/129  
(Continued)

*Primary Examiner* — Nkeisha Smith  
(74) *Attorney, Agent, or Firm* — Anthony H. Handal; Melissa A. Tharp; Handal & Morosky

(57) ABSTRACT

Head assembly for keeping and positioning an optical or electronic device, that has a housing (1) in which a shell (3) is arranged by spherical connection that allows guided movement in any direction, wherein the shell (3) has a cylindrical symmetric cavity, and the housing and the shell can be fixed to each other in any adjusted position, and a body (4) holding the device is arranged in the cavity of the shell (3) so that the body (4) can be turned around two mutually normal axes with respect to the cavity and the position thereof can be fixed and released by a single adjustment means, wherein the connection between the shell (3) and the body (4) is independent from the connection between the shell (3) and the housing (1).

11 Claims, 4 Drawing Sheets

(51) Int. Cl.
*F16M 11/20* (2006.01)
*F16C 11/10* (2006.01)
*F16M 13/02* (2006.01)

(52) U.S. Cl.
CPC ....... *F16M 11/125* (2013.01); *F16M 11/2078* (2013.01); *F16M 13/02* (2013.01); *F16M 2200/022* (2013.01)

(58) Field of Classification Search
USPC ...... 248/278.1, 181.1, 183.4, 179.1; 396/428
See application file for complete search history.

(56) References Cited

U.S. PATENT DOCUMENTS

| | | | | |
|---|---|---|---|---|
| 3,815,892 A * | 6/1974 | Tulk | ...................... | B23Q 1/545 248/181.1 |
| 4,591,120 A * | 5/1986 | Bryant-Jeffries | ...... | F16M 11/14 248/179.1 |
| 5,072,907 A * | 12/1991 | Vogt | ...................... | F16C 11/106 248/181.1 |
| 5,118,058 A * | 6/1992 | Richter | ................. | F16C 11/103 248/183.2 |
| 5,249,766 A * | 10/1993 | Vogt | ...................... | F16C 11/106 248/181.1 |
| 5,769,370 A * | 6/1998 | Ashjaee | ................. | F16M 11/14 248/168 |
| 5,911,393 A * | 6/1999 | Reuter | ................... | F16M 11/10 248/181.1 |
| 7,281,693 B2 * | 10/2007 | Chou | ..................... | F16M 11/14 248/179.1 |
| 8,083,190 B1 * | 12/2011 | Ma | ....................... | F16M 11/105 248/128 |
| 8,628,258 B2 * | 1/2014 | Vogt | ...................... | F16M 11/041 396/428 |
| 9,429,186 B2 * | 8/2016 | Forthaus | ............. | F16C 11/0628 |
| 9,695,869 B2 * | 7/2017 | Blachon | ................ | F16C 23/046 |
| 9,964,141 B2 * | 5/2018 | Chopra | ................ | F16C 43/02 |
| 10,087,982 B2 * | 10/2018 | Faccioli | .............. | F16C 11/0604 |
| 2007/0090238 A1 * | 4/2007 | Justis | ................. | A61B 17/7038 248/181.1 |
| 2008/0210832 A1 * | 9/2008 | Speggiorin | ............ | F16M 11/14 248/183.1 |
| 2011/0006170 A1 * | 1/2011 | Liu | ...................... | F16M 11/041 248/121 |
| 2013/0108255 A1 * | 5/2013 | Vogt | ..................... | F16M 11/041 396/428 |
| 2017/0276288 A1 * | 9/2017 | Ramsauer | ................ | F16M 7/00 |

* cited by examiner

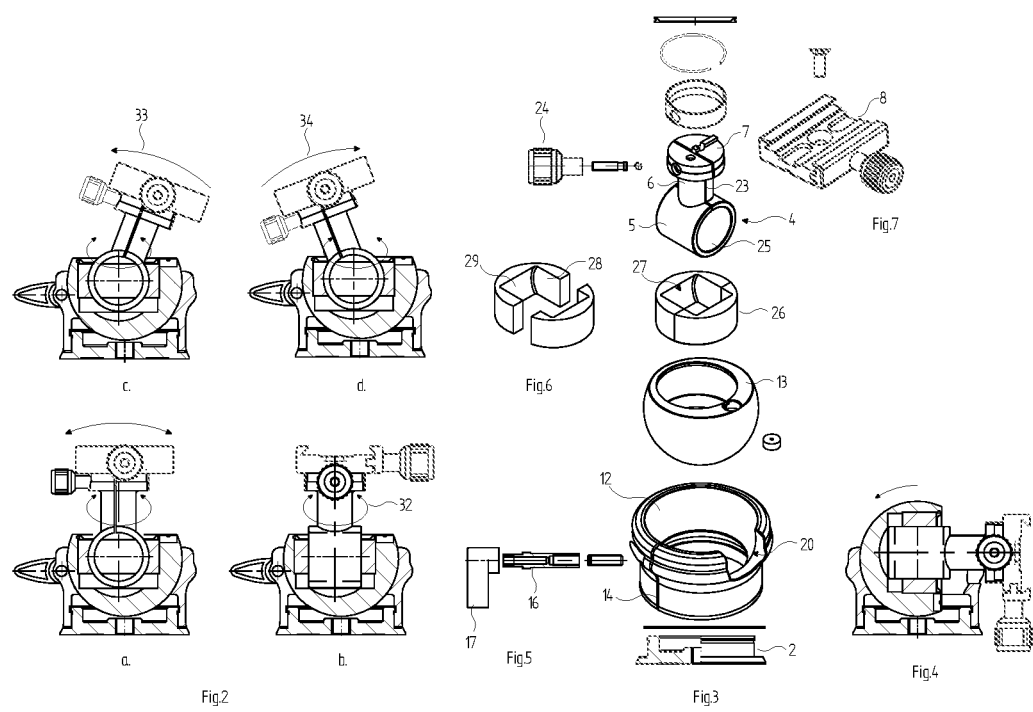

HEAD ASSEMBLY FOR SUPPORTING AND ADJUSTING THE POSITION OF AN OPTICAL OR ELECTRONIC DEVICE

The invention relates to a head assembly for supporting and adjusting the position of an optical or electronic device.

Head assemblies of this kind are generally referred to as tripod heads, and their basic task lies in that they can be placed on a support or tripod, and a photographic or video camera or a similar optical or opto-electronic device, in the following "camera" can be quickly fasted on the top of the head assembly, and the task includes that the head assembly can not only hold the camera but it should enable the adjustment and fixing of the camera in any position as required by the operator. Such head assemblies have two main types: the first type has a spherical joint and it enable adjustment of the camera in any direction, i.e. it provides three degrees of freedom. The second type allows adjustment of the position of the camera around two mutually normal axes, i.e. it has only two degrees of freedom, and here the directions of these axes are generally horizontal and vertical.

In case of professional photography or video recordings one basic requirement is to keep the horizon of the camera, i.e. to allow only such camera positions in which the camera keeps its horizontal plane. This is the reason why adjusting systems with two degrees of freedom have received wide acceptance, however, in these systems one has to separately ensure that the upper surface of the tripod that holds the head assembly be horizontal. Although the position of the upper plane of most tripods is adjustable, tripods or other camera supports cannot ensure accurate horizontal positioning, therefore when head assemblies with two degrees of freedom are used one has to separately care for the horizontal positioning of the basic plane. The adjustment of the horizontal basic plane is also required in case of head assemblies with three degrees of freedom, because there are special directions (horizontal and vertical camera positions) that have to be adjusted quickly.

An example for systems with three degrees of freedom Is described in the publication EP 2613074 A1, that has a plurality of adjustment knobs and performs its function in a compact manner.

A typical example for systems with two degrees of freedom is described in U.S. Pat. No. 8,418,973 that also have a plurality of adjustment and fixing knobs that fix the camera position after being turned around an associated axis.

Neither one of the described type can level the supporting basic plane, i.e. a previous leveling of the horizontal basic plane is required.

In the Hungarian publication HU P98 00084 has tried to solve the task of horizontal leveling and a head assembly was proposed that had a basic camera support element that was adjustable with respect to a housing around three axes, whereby it was adjustable in horizontal position after having been mounted on a tripod, however, it was unable to provide an adjustability with two degrees of freedom with respective to the basic holding element, because the housing and the holding element were connected by a fixing member. For adjusting the head assembly around two axes and for its fixing two separate adjusting and fixing elements were required of which one fixed the housing to the basic holding element.

The ever increasing need to realize an easy and quick fastening has been imposing new tasks to be solved.

Such a task is to provide a head assembly which, according to the choice of the operator, allows the adjustment of the camera either with three degrees of freedom or with two degrees of freedom, moreover, during adjustment with two degrees of freedom instead of using two separate adjusting and fixing elements, the need for a single such element has been defined.

Further to the above defined needs it is also required that the head assembly can ensure and keep the horizontal position by means of an easy handling and to also ensure an adjustability with two degrees of freedom, wherein the adjustment and the free turning can take place around the previously adjusted horizontal and vertical axes.

The here defined requirements should be fulfilled with small dimensions and simple design so that only a single adjustment means be required.

The basic task of the present invention is to provide a head assembly that can satisfy all these needs and requirements. The second task of the invention is more modest and has set an important objective according to which an adjustment system has to be provided with two degrees of freedom that uses only a single adjustment means.

According to the invention a head assembly has been provided for keeping and positioning an optical or electronic device, that has a housing in which a shell is arranged by spherical connection that allows guided movement in any direction, wherein the shell has a cylindrical symmetric cavity, and the housing and the shell can be fixed to each other in any adjusted position, and a body holding the device is arranged in the cavity of the shell so that the body can be turned around two mutually normal axes with respect to the cavity and the position can be fixed and released by a single adjustment means, wherein the connection between the shell and the body is independent from the connection between the shell and the housing.

Accordingly the head assembly comprises a housing, a body fixed in the housing, the body comprises a support element that can be attached to the device, wherein the body together with the support element can be turned, adjusted and fixed within respective angular ranges around two mutually normal first and second axes, the housing comprises a shell arranged in the housing so that the shell can be adjusted in any position with respect to the housing and can be fixed in the adjusted position, the housing has a spherical inner cavity and the shell has a spherical outer surface fitting to the inner cavity of the housing and by means of the two fitting spherical surfaces the shell is arranged in such a way in the inner cavity of the housing that within predetermined limits the shell can be turned with respect to the housing in any direction, and the assembly further comprises a device arranged between the housing and the shell adapted to allow releasable fixing of the shell to the housing in any previously adjusted position, and the shell comprises an inner cavity which has a rotational symmetrical form around at least one axis, wherein the assembly comprises an adjustment device arranged between the shell and the body that allows free adjustment of the position of the body with respect to the shell with two degrees of freedom by allowing turning of the body around the first axis and also around the second axis which is normal to the first axis so that the adjustment device is capable of releasably fixing the body to the shell in any adjusted position without affecting the connection between the shell and the housing.

The adjustment will become substantially simpler if the adjustment device with two degrees of freedom comprises a single common adjusting member that is capable of fixing the body to the shell in any adjusted position.

In an embodiment of the common adjusting device the body comprises a gap extending along the body in a predetermined length and dividing the body in two separated parts, and the adjusting member comprises an adjustment element the can be hand-operated and which is capable of adjusting the distance between said two separated body parts.

The body has preferably a bottom part comprising an outer surface which is circularly symmetric around at least an axis, the bottom part is surrounded by an insert that has an inner cavity which is fitted to the outer surface of the bottom part along at least one zone, and the insert has an outer surface that is fitted to the rotational symmetrical cavity of the shell in a second zone.

In a preferable embodiment when the body parts of the body are pressed away from each other, this pressure presses the surface of the body to the insert that results in a resilient expansion of the outer surface of the insert that will get pressed to the cavity of the shell, whereby the shell will be coupled and fixed both to the insert and to said body.

In a preferable embodiment the surface of the cavity of the shell to which the insert is fitted is a cylindrical surface.

In a preferable embodiment the shape of the outer surface of the body and of the shape of the cavity of the insert prevent turning of the body with respect to the insert around the first axis but allow turning around the second axis, and the insert has an outer surface which, together with the inner surface of the cavity of said shell are fitting cylindrical surfaces.

The surface of the body which is fitted to the interior of the insert is preferably at least in part a cylindrical or a spherical surface.

In an alternative embodiment the surface of the body fitted to the insert is a spherical surface, and through the body of this sphere a through bore is provided that has an axis which falls in the equatorial plane of the sphere and which is normal to the first axis, and in the extension of the bore respective bores are provided in the opposing walls of the shell, and a shaft is placed in and extending through these bores and have respective end parts, a ring shaped groove is provided in the interior wall of the shell that has a central plane normal to the first axis and in and along the groove the end parts are arranged and guided, and the body can be turned around the shaft.

In a further preferable embodiment the surface of the body fitted to the insert is a spherical surface, and in the body of the sphere that faces towards the shell a groove is provided with predetermined width and depth that extends along in a predetermined length in parallel to the first axis, and along the axis of the inner cavity of the shell from the bottom of the wall of the shell a pin is extending out towards and fitted in the groove of the sphere so that the axis of the pin falls in the first axis, whereby the body is guided along the groove by the pin, and the pin allows turning of the body around the first axis.

In this embodiment it is preferable if a short guiding element is inserted in the groove with a shape fitting to that of the groove, and the guiding element comprises a through bore in which the pin is inserted and led through.

The horizontal leveling can be ensured if the shell has a planar upper surface which is normal to the first axis, and the axis of the outer surface of the shell and the axis of the inner cavity of the shell extend in parallel to each other and these axes are offset from each other in a direction normal to the first axis, whereby the wall of the shell has a varying thickness, and in a section where the wall thickness is about the largest a bubble level is inserted in the upper face of the wall that can be used to adjust the planar surface of the shell to be horizontal and the first axis to be vertical in any position of the housing.

For the sake of providing a fast vertical position of the camera a lateral opening is provided on the side wall of the housing which allows in the released state of the connection between the housing and the shell that the axis of the body be adjusted in a position normal to the first axis that is to take a horizontal or almost horizontal position.

According to a second aspect of the invention an adjusting assembly has been provided for connecting to bodies into each other so that their position can be adjusted freely around two mutually normal axes and to fix any adjusted position, wherein the assembly comprises a single common adjustment device allowing adjustment around the two axes and fixing the two bodies together in any adjusted position.

In this embodiment it Is preferable if one of the two bodies comprises a cavity having circular symmetry, and a similarly circular symmetrical portion of the other body is fitting thorough an expandable insert in the cavity of the first body, and in the circularly symmetrical portion a gap is extends through along a predetermined depth that divides the portion in two parts, and the common adjustment device moves these parts away from each other and presses thereby these parts, the insert and the fitting bodies to each other, whereby their positions are fixed and when the parts are moved towards each other, the bodies get released that allows mutual displacement thereof.

The solution according to the invention enables in the described way a movement with three degrees of freedom between the housing and the shell, but if the shell is fixed to the housing, then a movement with two degrees of freedom will be provided between the shell and the body, in which the previous adjustment of the axis of the shell in vertical direction can be resolved in an easy way.

A further aspect of the invention enables the adjustment with two degrees of freedom by a single common adjustment means.

The invention will now be described in connection with preferable embodiments thereof, in which reference will be made to the accompanying drawings. In the drawing:

FIGS. 2a to 2d show the sectional views of the embodiment of FIG. 1 in smaller scale to illustrate different phases of the turning of the body;

FIG. 3 is the exploded view of the first embodiment;

FIG. 4 shows the first embodiment in fully inclined state;

FIG. 5 shows the design of the lower adjustment bolt 16;

FIG. 6 shows the perspective view of the insert 27 in smaller scale;

FIG. 7 shows the perspective view of the upper support 8;

Figure 1:
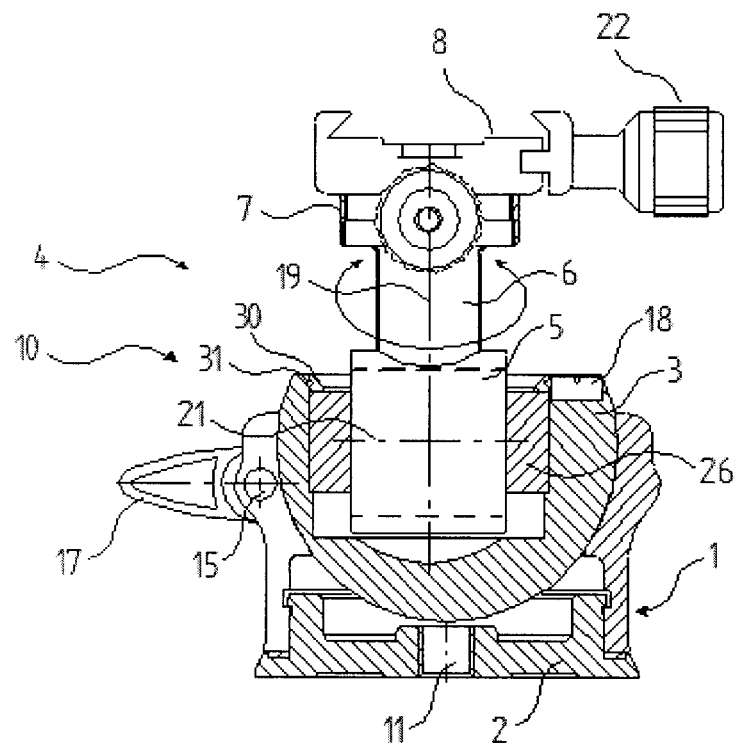
FIG. 1 shows the sectional view of a first embodiment of the head assembly.

FIG. 1 shows the sectional elevation view of the first embodiment of a head assembly 10 made according to the present invention. The head assembly 10 can be divided into four main constructional parts. The first part is constituted by a housing 1 with a lower support 2 attached thereto forming a common structural unit. The second part is a shell 3 that has a spherical outer surface. The third part is a body 4 that can be freely rotated about two mutually perpendicular axes, that has a lower body part 5, a preferably cylindrical neck 6 extending out of the lower body part 5 in upward direction and being firmly coupled thereto and a head portion 7 at which the neck 6 ends. The fourth part is an upper support 8 that can be attached to the body 4 by means of the head portion 7, adapted to connect the head assembly 10 to a camera, video equipment, an optical or any other electronic device.

The housing 1 is constituted preferably by a body with a vertical axis that has rotational symmetry, and the lower support 2 of the housing has a planar lower face provided with a central threaded bore by which the lower support 2 can be releasably attached to the top of a tripod, camera pedestal or of any similar support means. The bottom of the housing 1 can be attached to the lower support 2 e.g. by means of a threaded connection. A characteristic property of the housing 1 lies in that it has a large upwardly facing recess with spherical inner surface 12 (see FIG. 3) into which the spherically designed outer surface of the shell 3 can be fitted. The inner surface 12 has an upper rim 13 which has a diameter smaller than the largest diameter of the spherical surface i.e. the upper rim 13 is located above the equator of the sphere, therefore the spherical shell 3 can be fitted into its place only after a flexible and resilient deformation of the wall of the housing 1. For enabling this opening operation a gap 14 (see FIG. 3) is provided in the housing 1 which extends preferably in parallel with the axis of the housing, whereby the wall of the housing 1 can be temporarily expanded to allow the insertion of the shell 3. In the wall of the housing 1 a threaded bore 15 is provided that extends normal to the plane of the gap 14 which receives a lower adjustment bolt 16 by which the width of the gap 14 can be increased or decreased against the resilient resistance of the material of the housing 1, whereby the position of the shell 3 inserted in this cavity can be tightened or loosened. In FIGS. 1, 3 and 5 it can be observed that the lower adjustment bolt 16 has a large flat head part 17 that facilitates handling.

From the point of view of the correct operation it is significant that by the loosening or fastening of the lower adjustment bolt 16 the shell 3 can be adjusted and fixed in any required angular position relative to the housing 1 fixed on a pedestal or tripod (not shown) within a predetermined angular range. This is important because in general the upper plane of a tripod head closes generally an angel with the horizontal plane, and the accurate horizontal positioning cannot be made in fast and simple way. The essence in the shown structure lies in the easy adjustability of the plane defined by the upper rim 13 of the shell 3 to the horizontal one even if the plane of the lower face of the housing 1 takes a general position.

For this purpose a leveler device, e.g. a bubble level 18 is arranged in the upper surface of the shell 3. In the exemplary embodiment the bubble level 18 is a small disc, and the shell 3 has preferably a changing wall thickness so that in the thickest wall portion a cavity for receiving the bubble level 18 can be provided. Of course, there are slightly inclined tubular bubble levels that can be embedded in the wall of the upper rim 13 of the shell 3, and in those cases the shell 3 might have uniform wall thickness. Following the horizontal positioning of the shell 3 the symmetry axis 19 of the spherical internal cavity thereof will take a vertical position. Owing to the asymmetric design of the wall of the shell 3 the axis 19 will be offset from the axis of the housing 1 which offset positioning has no effect from the point of view of the operation and adjustability of the subject device, since as it will be explained—during the subsequent positioning the shell 3 will always retain its pre-adjusted horizontal position.

Concerning the design of the housing 1 it is noted that at a sleeve-like upper portion of the housing 1 an opening 20 is provided which is shown in FIG. 3 that makes it possible to place the machine (camera) when supported by the present head assembly into a vertical position required for preparing portrait pictures, and the axis of the body 4 be horizontal. This position can be ensured by loosening the shell 3 and the depth of the opening 20 is sufficiently high to provide place for the neck 6 inserted therein.

The common task of the central cavity in the shell 3 and the structural parts inserted therein that includes the lower body part 5 of the body 4 lies in to enable free movement and adjustment of the body 4 with two degrees of freedom, so that the body 4 retains the preset vertical direction but can be freely rotated, adjusted and fixed both around the vertical axis and around a horizontal axis in any angular position.

Several designs are known that enable movement with two degrees of freedom, therefore in the following only a few non-limiting examples will be shown of which the embodiment as shown in FIGS. 1 to 4 represents only a single species. Let us suppose now that the body 4 can be freely turned with respect to the shell 3 around the vertical axis 19 and around horizontal axis 21 (shown in FIG. 1).

The neck 6 of the body is sufficiently long to prevent during any adjustment operation for the upper support 8 coupled to the head portion 7 and for the camera fitted thereon (not shown) to become blocked by the head assembly 10. In the exploded view of FIG. 3 the body 4, the lower body part 5, the neck 6 and the head portion 7, can be seen and in FIG. 7 the upper support 8 with the recess for receiving camera and a position fixing screw 22.

Concerning the design of the body 4 it is significant that a slot 23 is provided through a great part of the central portion of the body 4, and by means of the slot 23 the two body halves separated thereby can be adjusted to become closer to or further away from each other within the resilience limit of the body material. In the head portion 7 a threaded bore is provided that receives a threaded portion of an adjusting bolt 24. The adjusting bolt 24 ends in a cylindrical pin that has an end face that pushes the inner face of the other one of the body parts separated by the gap 23, and the extent of the pushing force can be adjusted by turning of the adjusting bolt 24. The body 4 can be pressed in the inner cavity of the shell by pushing the two body parts away from each other, whereby the position of the body 4 is fixed around both axes. In the loosened state of the adjusting bolt 24 the position of the body 4 can be freely adjusted around both axes.

For understanding the embodiment shown in FIGS. 1 to 7 reference is made first to the exploded view of FIG. 3, in which one can see that in this embodiment the lower body part 5 of the body 4 is constituted by a tube 25 with a horizontal axis and which has a pair of vertical end faces. The assembly further includes an insert 26 made of two parts and shown separately in FIG. 6 made preferably of a plastic material. When the two parts are attached to each other the insert has a cylindrical outer surface with vertical axis. The insert 26 can be loosely fitted in a cylindrical cavity having a vertical axis and made in the interior of the shell 3, and at the lower end the insert 26 is supported by a narrow shoulder that can be observed in the sectional view of FIG. 1.

In the interior of the insert 26 a cavity 27 is provided that has a pair of oppositely positioned planar walls 28 with a spacing equal to the length of the tube 25. The surfaces normal to this plane are two separated cylindrical surfaces that have a horizontal axis and the diameter thereof fits to the diameter of cylindrical surface of the tube 25 constituting the lower body part 5 of body 4. The insertion of the body 4 in the cavity of the shell 3 is carried out by placing first the two parts of the insert 26 on and around the tube 25 constituting the lower body part 5 of the body 4, when the cavity 27 receives and surrounds the tube 25 in such a way that the two end faces of the tube 25 abutting the planar walls 28, and the cylindrical outer surface of the tube 25 is encircled by the fitting cylindrical inner surface of the insert 26. In this position the body 4 together with the insert 26 that encircles its lower body part 5 cam be inserted in the cavity of the shell 3 and the bottom of the insert 26 is held and supported by the lower shoulder of the cavity. The position of the insert 26 is secured by a closing ring 30 placed on the top thereof and a washer spring 31 which is inserted and fitted in a ring shaped groove made in the inner wall of the shell 3 (FIG. 1).

In the sketches of FIGS. 2a to 2d the different ways of moving the body have been shown, and it was supposed that previously the shell 3 has been adjusted in horizontal position and has been fixed to the housing 1 by fastening the lower adjustment bolt 16. Sketches 2a. and 2b. show the way of turning the body 4 around the vertical axis 19 in two different angles that close 90° with each other when the turning takes place along arrow 32. When we wish to turn the body 4 around the vertical axis 19 in the direction of the arrow 32, then the two planar faces of the tube 25 constituting the lower body part 5 of the body 4 meet the planar walls 28 of the insert 26, and the torque acting on the tube 25 strives to turn the insert 26. Under this effect the insert can freely turn around in the cylindrical recess of the shell 3 that has a vertical axis that surrounds the insert 26. In this way the body 4 can take any angular position including the two positions shown in FIGS. 2a and 2b. Following the adjustment of the body 4 in any required position the adjustment bolt 24 is turned so that the two body parts separated by the gap 23 will be pushed away from each other, and the slightly opening of the body parts will press the to parts of the insert 26 against the cylindrical cavity of the shell 3, whereby the position of the body get fixed. This fastened position can be released by turning the adjustment bolt 24 in the other direction, whereby this operation enables a fine and accurate position adjustment.

If we wish to turn the body in a direction normal to this previously described one, i.e. around the axis of the tube 25 that extends normal to the plane of the FIGS. 2c. and 2d., then this rotation is allowed by the cylindrical design of the inner surface 29 of the insert 26. In the sketches 2c. and 2d. the body 4 is shown in two different angular positions turned around the arrows 33 and 34. The free turning is possible until the lower edge of the body 4 abuts the upper rim of the shell 3. In the practice this angular range of rotation provides a sufficiently broad adjustability. The fixing of the body 4 in the adjusted one can be made again by means of the adjustment bolt 24, because the pressing of the two separated body parts apart fastens the position of the tube 25 in the insert 26 and simultaneously also fixes the position of the insert 26 in the cavity of the shell 3.

Based on the above described embodiment it can be understood that the position of the body 4 and thereby of the upper support 8 that holds the camera can be adjusted with two degrees of freedom i.e. by turning around the horizontal and vertical axes, in case the position of the shell 3 has been previously fixed in the housing 1, preferably in the required horizontal position. A difference compared to conventional previous solutions that the body 4 and thereby the head assembly 10 can be fixed and released by means of a single adjustment element, namely of the adjustment bolt 24. The positioning of the axes to the horizontal and vertical directions can be provided by the described adjustment of the position of the shell 3.

In case if from any reason the adjustment of the camera was required not with two but with three degrees of freedom to enable positioning in any direction, then this can be solved by fixing the body 4 to the shell 3 by fastening the adjustment bolt 24, and after releasing the lower adjustment bolt 16 the shell 3 can be positioned in the housing 1 as a conventional spherical connection that enables adjustment with three degrees of freedom. This is the situation when it is possible to adjust the vertical position of the lower face of the camera as shown in FIG. 4.

The performing and separate realization of the double function described hereinabove has been enabled by the fixing of the body 4 only to the shell 3 and in no way to the housing 1, therefore the adjustability of the relative position of the body 4 and the shell 3 has no influence on the relative position between the housing 1 and the shell 3.

Figure 8:
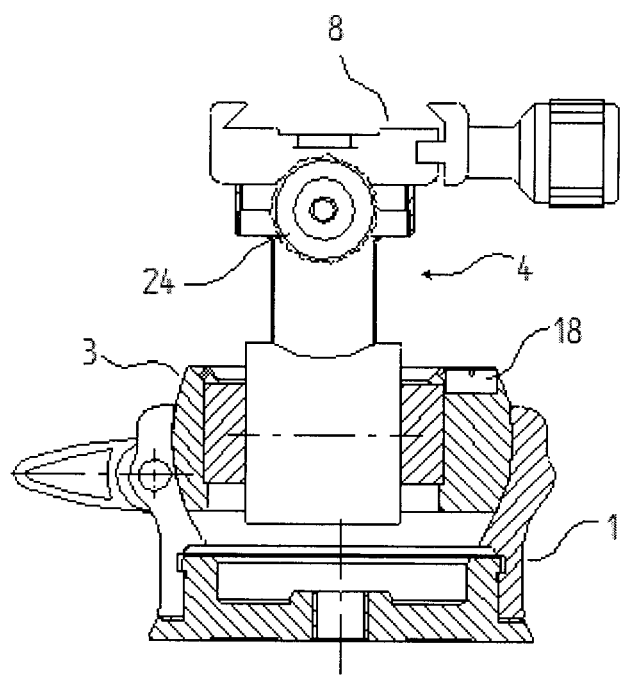
FIG. 8 shows the sectional view of a second embodiment of the head assembly.

The embodiment shown in FIG. 8 differs from the one shown in FIG. 1 only in that here the shell 3 is a partial sphere that does not comprise the lower spherical part shown in FIG. 1. In this embodiment the weight and the manufacturing costs are decreased and it does not noticeably decreases the adjustability range of the shell 3.

Figure 9:
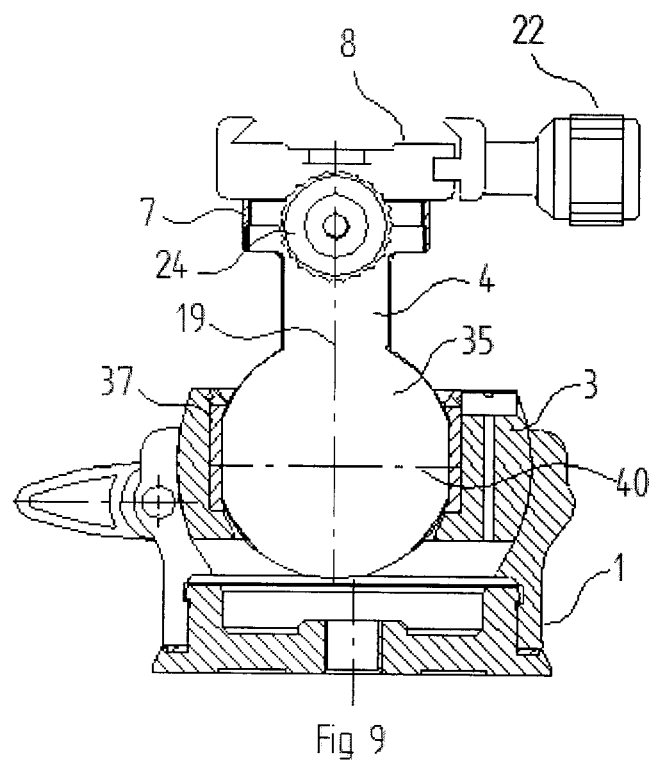
FIG. 9 shows the sectional view of a third embodiment of the head assembly.
Figure 10:
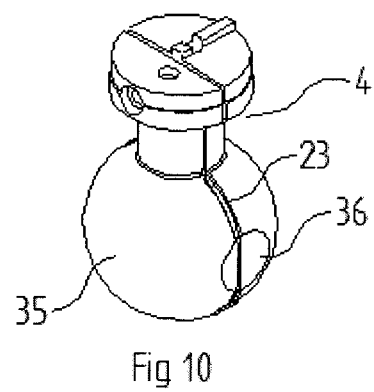
FIG. 10 shows the perspective view of the body 4 of FIG. 9 in smaller scale.
Figure 11:
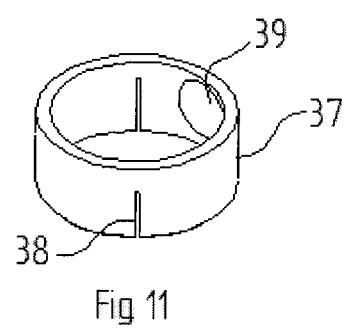
FIG. 11 shows the perspective view of the insert 37 of FIG. 9 in smaller scale.

In FIGS. 9 to 11 a further preferable embodiment for the connection between the body 4 and the shell 3 will be shown and described. The difference lies in that the lower part of the body 4 is constituted by a sphere 35 that has a pair of oppositely located parallel planes 36 as faces which have respective circular contour lines. In the sphere 36 and in the other body parts i.e. in the neck and in the upper support 8 a similar gap 23 is provided and the adjustment of the body parts separated by the gap 23 takes place also by means of the adjustment bolt 24. FIG. 11 shows the perspective view of insert 37 that receives the sphere 35. The insert 37 is made of a slightly elastic plastic material in which two slots 38 are provided that enable expansion and it has a cylindrical outer surface that fits in the cylindrical cavity with vertical axis made in the shell 3. The interior cavity of the insert 37 is substantially a spherical shell and fits to the outer surface of the sphere 35, and the equator falls in a central zone i.e. the diameter of its upper and lower openings are smaller than the largest internal diameter. A further characteristic of the inner surface of the shell is that it comprises a pair of oppositely positioned planar surfaces 39 which has a size and a spacing distance that corresponds to the planar surfaces 36 on the sphere 35.

Owing to the described design the sphere 35 can be inserted by a pushing force in the interior of the insert 37 when the gaps 38 are somewhat opened, and when the planes 36 fitting the planar surfaces 39 in the interior of the insert 37 then any turning of the sphere around its vertical axis is followed by the similar turning of the insert 37. The body 4 will then inserted together with the insert 37 that receives the sphere 35 into the cylindrical cavity of the shell 3. The position of the assembly is secured against pulling out in a way similar to that shown in FIG. 1 by a closure ring and a flexible washer.

When we wish to turn the body 4 around the vertical axis 19, then as described in the preceding paragraph, the insert 37 can be freely turned in the interior of the cylindrical cavity of the shell 3. The position can be fixed by the slight displacement of the two body parts as it was explained at the previous embodiment. When a turning around the horizontal axis 40 is required, the insert 37 keeps its position because the cylindrical cavity of the shell 3 and its own matching cylindrical outer surface prevents displacement, whereas the two spheres can be freely turned around the horizontal axis 40. The turning in the other direction is prevented by the form-fitting connection between the planar surfaces 36 of the sphere 35 and the planar surfaces 39 of the insert 37.

The fixing in the adjusted position is made by pushing the two body parts part away from each other by means of the adjustment bolt 24. The fixing can be released by the adjustment bolt 24 if the pressure is released.

Figure 12:
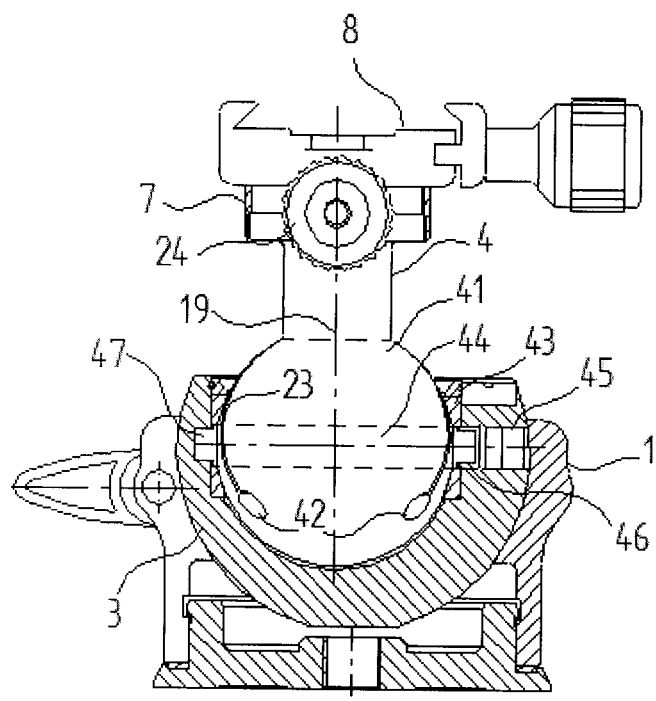
FIG. 12 shows the sectional view of a fourth embodiment of the head assembly.

The fourth example to the turning of the body 4 around two mutually normal axes is shown in FIG. 12. In this embodiment, similarly to the previous example, the lower part of the body 4 is constituted by a sphere 41 in which along one equator plane thereof a through going bore is provided so that the axis of the bore falls in the equatorial plane. In this example the slot 23 extends in a slightly inclined direction not to cross the aforementioned bore, and it ends at the lower part of the body in larger holes 42. In the shell 3, similarly to the foregoing examples a cylindrical cavity is provided with the vertical axis 19 in which an insert 43 made preferably of a plastic material can be fitted which as a design and position fixing just as in the previous embodiment. In the interior of the insert 43 a spherical cavity is provided, thus a difference compared to the previous embodiment is the lack of the planar surfaces 39, i.e. the spherical surface is not broken by any plane. At the same time in the extension of the through going bore made in the middle of the sphere 41 a pair of similar bores are provided in the wall of the insert 43. Because the mouth openings of the insert 43 are smaller than the diameter of the sphere 41, the possibility of the insertion of the sphere 41 in the insert 43 has required the formation of gaps in the material of the insert 43 so that its transitional and resilient expansion enables the insertion of the sphere 41.

A shaft 44 is lead through the bores of the sphere 41 and of the walls of the insert 43 which can be seen in its introduced position in FIG. 12. The assembly should be made in the following sequence: first the sphere 41 should be inserted in the described way in the insert 43 so that the axes of their bores fall in the same straight line, then the shaft can be inserted in these bores through a bore 45 made in the wall of the shell 3 in a state when the shell has not yet been inserted in the housing 1. On both ends of the shaft 44 respective guiding pins 46, 47 are provided. Following the insertion of the shaft 44 the position thereof can be fixed by appropriate holding elements placed in the bore 45.

In the interior cavity of the shell 3 at the height of the greatest diameter of the sphere 41 an inner circular groove is provided that has a width corresponding to the diameter of the guiding pins 46, 47.

The tilting (turning) of the so obtained assembly around the horizontal axis is automatically enabled by the presence of the bore and the shaft 44 in the bore. When a turning around the vertical axis 19 is required, the guiding pins 46, 47 can freely move along and around the circular groove in the shell 3.

If the parts of the sphere 41 separated by the gap 23 are pressed away from each other by means of the adjustment bolt 24, the insert 43 will press against the inner wall of the cavity of the shell 3 that keeps the assembly in the adjusted position. This pressure will also prevent the rotation or displacement around the horizontal axis, thus the body 4 will keep the previously adjusted position.

The fifth embodiment of the head assembly according to the present invention is described with reference to FIGS. 13 to 17. The design of the body 4 is largely similar to the previous embodiment, i.e. the lower body part 5 is a sphere 51, and the difference compared to the sphere 41 lies in that the sphere 50 is not provided with a trough going bore but symmetrically to its central vertical plane a groove 51 with predetermined width and depth is provided that extends along a predetermined angular range. In FIG. 3 the groove 51 can be seen from a direction normal to the plane of the drawing, while FIG. 14 shows the side view thereof, and the task of the groove 51 to keep and guide the body 4 in the vertical plane when it is turned around the horizontal axis 52 (see FIG. 14).

The sphere 50 is encircled by an insert 53 which is similarly designed as the insert of the previous embodiment, namely the insert 53 has a cylindrical outer surface that is inserted and fitted in the cylindrical cavity of the shell 3 that has the vertical axis 19, and the insert 53 has a spherical cavity that fits to the size of the sphere 50. The insertion of the sphere 50 in the cavity of the insert 53 is facilitated by the presence of gap 54 (see FIG. 15) just as in case of the previous embodiment. The inner cavity of the shell 3 under the aforementioned cylindrical bore has a curved design that will never meet with the sphere 50 inserted in the cylindrical cavity, but at the same time as shown in the enlarged sectional detail of FIG. 17 the bottom of the shell 3 is provided with an upwardly projecting cylindrical pin 55 and the upper end thereof extends and fits in the interior of the groove 51. The accurate guiding of the pin 55 along the groove 51 is provided by a substantially rectangular guiding element 56 made of a plastic material that comprises a through going bore fitted to and receiving the pin 55. In the enlarged views of FIGS. 16 and 17 it can be seen that the guiding element 56 accurately fits in the groove 51, and when the sphere 50 and with it the grove 51 is moved with respect to the stationary shell 3 and the pin fixed to the shell 3, then the guiding element 56 is sliding along the groove 51.

The assembly of the embodiment shown in FIGS. 13 to 17 takes place preferably in the following sequence. The insertion, leveling and fixing of the shell 3 in the housing occurs just as described earlier. Then the insert 53 is force-fitted on the sphere 50 of the body 4, and thereafter the guiding element 56 is positioned on the pin 55 so that the longitudinal direction thereof falls in the direction of the groove 51. More particularly, the body 4 and the insert 53 are arranged and inserted in the cavity of the shell 3 so that the pin 55 and its guiding element 56 be inserted and fitted in the groove 51.

Figure 14:
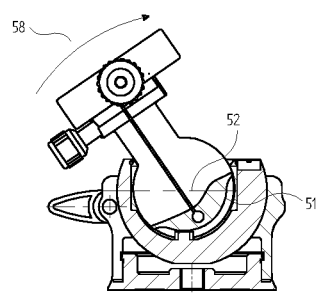
FIG. 14 is a view similar to FIG. 13 turned by 90° relative thereto and with an inclined body 4.
Figure 15:
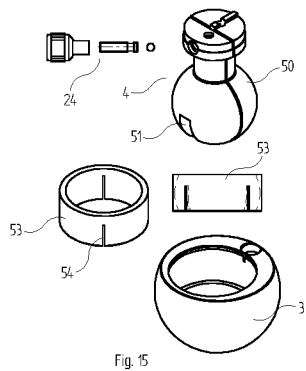
FIG. 15 shows the perspective view of the elements of the fifth embodiment in smaller scale.
Figure 17:
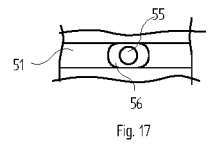
FIG. 17 is an enlarged sectional view showing the detail of FIG. 16.
Figure 13:
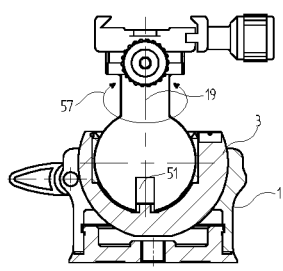
FIG. 13 shows the sectional view of a fifth embodiment of the head assembly.
Figure 16:
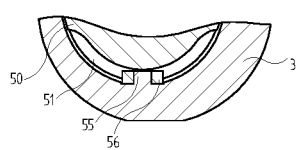
FIG. 16 shows an enlarged detail of the fifth embodiment.

The turning around both the vertical and horizontal axes 19, 52 is illustrated in FIGS. 13 and 14. The body can be turned around the vertical axis 19 any time, because this is allowed by the connection between the sphere 50 and the insert 53 and also the cylindrical connection between the insert 53 and the cylindrical cavity of the shell 3. Moreover in this embodiment there is even no need to allow for the insert 53 to turn in the cavity of the shell 3. In any position of the body 4 the connection between the pin 55 and the groove 51 allows the turning around the vertical axis 19, therefore the body 5 can be turned in any angular position along the double arrow 57 shown in FIG. 13. The turning around the horizontal axis 12 is illustrated in FIG. 14. In this case the turning along arrow 58 is limited by the length of the groove 51. In such turning movement the guiding element 56 is sliding along the groove 51 and ensures that the movement of the body 4 remains in the vertical plane.

In any of the foregoing embodiment the adjustments can be fixed in the described way by means of the adjustment bolt 24, because when the two parts of the body are pressed to open, the sphere 50 will get pressed to the insert 53 and the insert 53 gets pressed to the cavity of the shell 3.

According to the invention a plurality of embodiments can ensure that with respect to the shell 3 the body 4 can be turned around two mutually normal axes, which have been previously leveled to take vertical and horizontal positions, whereas the fixing of the position of the body 4 the use of a single adjustment bolt 24 is sufficient.

In all embodiments it is true that the shell 4 can be turned and adjusted in any direction with respect to the housing 1, i.e. in any position taken by a tripod (not shown in the drawing) the upper plane of the shell 3 can be adjusted to take a horizontal plane. The camera or machine fixed on the head assembly 10 can be conveniently turned around two mutually normal axes in any direction and can be fixed in any position, and in case the shell 3 and the body 4 are fixed to each other, the shell 3 can be moved in any direction with respect to the housing 1. The opening 20 made in the side wall of the housing 1 enables the full tilting of the body required for making portrait pictures.

Further preferable properties of the head assembly 10 include the small structural dimensions and the comparatively simple way of manufacturing, whereas the simple handling greatly increases easy use.

The properties described and summarized here can be attained not only with the embodiments shown but a man skilled in the art will be able to realize numerous other embodiments without departing from the basic inventive concept.

The invention claimed is:

1. A head assembly for supporting and adjusting position of an optical or electronic device, comprising a stationary housing, a body fixed in the housing, the body comprises a support element that can be attached to said device, the housing comprises a shell arranged in the housing said housing has a spherical inner cavity and the shell has a spherical outer surface fitting to said inner cavity of the housing, and along the spherical inner cavity and the spherical outer surface the shell can be turned with respect to the stationary housing to adjust to any adjusted position of the shell, and said assembly further comprises a fixing device arranged between the housing and the shell adapted to allow releasable fixing of the shell to the housing in any of the adjusted positions, and said shell comprises an inner cavity which has a rotational symmetrical form around at least one axis, wherein said body is arranged in said inner cavity of the shell so that said support element can be turned, adjusted and fixed within respective angular ranges around two mutually normal first and second axes with respect to the shell, the head assembly further comprising an adjustment device arranged between said shell and said body that allows free adjustment of a position of the body with respect to the shell without affecting connection between said shell and said housing, said adjustment device comprises a single common adjusting member, wherein said body comprises a gap extending along said body in a predetermined length and dividing the body in two separated parts, and said adjusting member comprises an adjustment element that can be hand-operated and which is capable of adjusting distance between said two separated body parts to press or release said body to said inner cavity of the shell.

2. The head assembly as claimed in claim 1, wherein said body has a bottom part comprising an outer surface which is circularly symmetric, said bottom part being surrounded by an insert that has an inner cavity which is fitted to said outer surface of said bottom part of the body along at least one zone, and said insert has an outer surface that is fitted to said rotational symmetrical form of said shell.

3. The head assembly as claimed in claim 2, wherein said body parts of said body are pressed away from each other, pressing a surface of the body to said insert that results in a resilient expansion of said outer surface of said insert that will get pressed to said cavity of the shell whereby said shell will be coupled and fixed both to said insert and to said body.

4. The head assembly as claimed in claim 3, wherein a surface of the cavity of the shell to which the insert is fitted is a cylindrical surface.

5. The head assembly as claimed in claim 3, wherein the shape of the outer surface of said body and the shape of the cavity of the insert prevent turning of the body with respect to the insert around a first axis but allowing turning around a normally extending second axis, and said insert has an outer surface which, together with the inner surface of said cavity of said shell are fitting cylindrical surfaces.

6. The head assembly as claimed in claim 3, wherein the surface of the body which is fitted to the inner cavity of said insert is at least in part a cylindrical or a spherical surface.

7. The head assembly as claimed in claim 2, wherein the surface of the body fitted to said inner cavity is a spherical surface, and through the body a through bore is provided comprising an axis which falls in a equatorial plane of said body and which is normal to a first axis, and in an extension of said bore respective bores are provided in opposing walls of the shell, and a shaft is placed in and extending through said bores having respective end parts, a ring shaped groove is provided in an interior wall of the shell comprising a central plane normal to said first axis and in and along said groove said end parts are arranged and guided, and said body can be turned around said shaft.

8. The head assembly as claimed in claim 2, wherein the surface of the body fitted to said inner cavity is a spherical surface, and a groove in the body facing towards the shell with predetermined width and depth is provided the groove extends along a predetermined length parallel to a first axis, and, along an axis of the inner cavity of the shell from the bottom of the wall of the shell, a pin is extending outward and fitted in the groove of the body wherein the axis of the pin falls in said first axis, whereby said body is guided along the groove by the pin, said pin allowing turning of the body around said first axis.

9. The head assembly as claimed in claim 8, wherein a short guiding element is inserted in the groove with a shape fitting to the groove, and said guiding element comprises a through bore in which said pin is inserted and led through.

10. The head assembly as claimed in claim 1, wherein said shell has a planar upper surface which is normal to a first axis and to an axis of the outer surface of the shell and an axis of the inner cavity of the shell extend in parallel to each other and are offset from each other in a direction normal to the first axis, whereby the wall of the shell has varying thickness, and in a section where the wall thickness is thicker than most other portions of the wall, a bubble level is inserted in the upper face of the wall configured to adjust said planar surface of the shell to be horizontal and said first axis to be vertical in the adjusted position of the housing.

11. The head assembly as claimed in claim 1, wherein a lateral opening is provided on a side wall of the housing which allows, in a released state of the connection between the housing and the shell, that an axis of the body be adjusted in a position normal to a first axis that is to take a horizontal or almost horizontal position.

* * * * *